(12) United States Patent
Yamashita

(10) Patent No.: US 10,764,472 B2
(45) Date of Patent: Sep. 1, 2020

(54) PROFILE ADJUSTMENT METHOD, PROFILE ADJUSTMENT APPARATUS, AND NON-TRANSITORY COMPUTER-READABLE STORAGE MEDIUM STORING PROFILE ADJUSTMENT PROGRAM

(71) Applicant: SEIKO EPSON CORPORATION, Tokyo (JP)

(72) Inventor: Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/533,973

(22) Filed: Aug. 7, 2019

(65) Prior Publication Data

US 2020/0053251 A1 Feb. 13, 2020

(30) Foreign Application Priority Data

Aug. 9, 2018 (JP) .................. 2018-149925

(51) Int. Cl.
*H04N 1/60* (2006.01)

(52) U.S. Cl.
CPC ........... *H04N 1/6058* (2013.01); *H04N 1/603* (2013.01)

(58) Field of Classification Search
CPC ....... H04N 1/60; H04N 1/6075; H04N 9/3182
USPC ........................ 358/529, 518, 523
See application file for complete search history.

(56) References Cited

U.S. PATENT DOCUMENTS

| 6,480,299 B1 * | 11/2002 | Drakopoulos | ....... H04N 1/6033 358/1.1 |
|---|---|---|---|
| 2007/0188780 A1 | 8/2007 | Edge | |
| 2014/0307277 A1 * | 10/2014 | Miyahara | ............. G06K 15/026 358/1.9 |

FOREIGN PATENT DOCUMENTS

| JP | 2009-527196 A | 7/2009 |
|---|---|---|
| JP | 2009-219061 A | 9/2009 |
| JP | 6123446 B2 | 5/2017 |

OTHER PUBLICATIONS

International Standard ISO 18619; Image Technology Colour Management—Black Point Compensation; First edition Jul. 1, 2015.

* cited by examiner

*Primary Examiner* — Jamares Q Washington
(74) *Attorney, Agent, or Firm* — Global IP Counselors, LLP

(57) ABSTRACT

Disclosed is a profile adjustment method for adjusting a profile used in color conversion processing for performing a black point compensation, the method including: an adjustment target profile reception step of receiving any one of an input profile representing a correspondence relationship between an input coordinate values in an input color space and device independent coordinate values in a profile connection space and an output profile representing a correspondence relationship between the device independent coordinate values and an output coordinate values in an output color space as an adjustment target profile; a black point information storage step of obtaining black point information from a color conversion table and storing the black point information in a private tag when the black point information representing a black point in the color conversion table is not stored in the private tag of the adjustment target profile before adjusting the color conversion table stored in the adjustment target profile; and an adjustment reception step of receiving an adjustment of the color conversion table.

8 Claims, 10 Drawing Sheets

FIG. 5A

INPUT PROFILE 610

CSi → A2B TABLE 611 ← CSc

| C | M | Y | K | L | a | b |
|---|---|---|---|---|---|---|
| ⋮ | ⋮ | ⋮ | ⋮ | ⋮ | ⋮ | ⋮ |
| $C_i$ | $M_i$ | $Y_i$ | $K_i$ | $L_i$ | $a_i$ | $b_i$ |
| $C_{i+1}$ | $M_{i+1}$ | $Y_{i+1}$ | $K_{i+1}$ | $L_{i+1}$ | $a_{i+1}$ | $b_{i+1}$ |
| ⋮ | ⋮ | ⋮ | ⋮ | ⋮ | ⋮ | ⋮ |

GD1 → (row $i$)
GD1 → (row $i+1$)

FIG. 5B

OUTPUT PROFILE 620

CSc → B2A TABLE 621 ← CSo

| L | a | b | c | m | y | k |
|---|---|---|---|---|---|---|
| ⋮ | ⋮ | ⋮ | ⋮ | ⋮ | ⋮ | ⋮ |
| $L_j$ | $a_j$ | $b_j$ | $c_j$ | $m_j$ | $y_j$ | $k_j$ |
| $L_{j+1}$ | $a_{j+1}$ | $b_{j+1}$ | $c_{j+1}$ | $m_{j+1}$ | $y_{j+1}$ | $k_{j+1}$ |
| ⋮ | ⋮ | ⋮ | ⋮ | ⋮ | ⋮ | ⋮ |

GD2 → (row $j$)
GD2 → (row $j+1$)

PROFILE ADJUSTMENT METHOD, PROFILE ADJUSTMENT APPARATUS, AND NON-TRANSITORY COMPUTER-READABLE STORAGE MEDIUM STORING PROFILE ADJUSTMENT PROGRAM

The present application is based on, and claims priority from JP Application Serial Number 2018-149925, filed Aug. 9, 2018, the disclosure of which is hereby incorporated by reference herein in its entirety.

BACKGROUND

1. Technical Field

The present disclosure relates to a technology for adjusting a profile used in color conversion processing for performing a black point compensation.

2. Related Art

An ICC profile is used to characterize an output color of a device. Here, ICC is an abbreviation of an international color consortium. The ICC profile is, for example, data representing a correspondence relationship between a device dependent color and a device independent color of a color device such as an offset print machine, an inkjet printer, or a display. The device dependent color of a print device such as an offset print machine or an ink jet printer is represented as coordinate values in a device dependent color space, and for example, CMYK values representing the amount of use of C, M, Y, and K. Here, C means cyan, M means magenta, Y means yellow, and K means black. The device independent color is represented, for example, by a color value in a CIE $L^*a^*b^*$ color space, which is a device independent color space, or by a color value in a CIE XYZ color space. Here, CIE is an abbreviation of an international commission on illumination. Hereinafter, description of "*" will be omitted from $L^*$, $a^*$, and $b^*$.

In order to reproduce an output color of an input device with an output device, an input profile that is an ICC profile which represents the characteristics of the output color of the input device, and an output profile that is an ICC profile which represents the characteristics of an output color of the output device, are used. Here, a color space dependent on the input device such as an offset print machine is represented as a CMYK color space, and a color space dependent on the output device such as an ink jet printer is represented as a cmyk color space. The expression "cmyk color space" is used to distinguish the cmyk color space from the CMYK color space dependent on the input device. Here, c means cyan, m means magenta, y means yellow and k means black. The color management system converts the CMYK values in the CMYK color space into the Lab values of a PCS with reference to the input profile, and converts the Lab values into the cmyk values in the cmyk color space with reference to the output profile. Here, PCS is an abbreviation of a profile connection space.

Since a black point of a color gamut of the input device and a black point of a color gamut of the output device are normally different, a black point compensation may be performed during a color conversion. For example, when the black point of the color gamut of the output device is outside the color gamut of the input device, the black point of the color gamut of the output device is not expressed unless a black point compensation is performed. In this case, an expressiveness of a dark portion of an output image is improved by performing a black point compensation to darken the black point of the color gamut of the input device at the time of a color conversion. Further, when the black point of the color gamut of the input device is outside the color gamut of the output device, a gradation of the dark portion of the output image is collapsed unless a black point compensation is performed. In this case, the gradation-collapse of the dark portion is eliminated by performing a black point compensation to brighten the dark portion of the color gamut of the input device at the time of a color conversion.

JP-A-2009-219061 shows that a black point compensation is performed based on a magnitude relationship between a black point of a display color gamut and a black point of a printer color gamut at the time of a color conversion.

A black point in a color conversion table may be changed when a user-adjustment of the color conversion table stored in a profile is received. In this case, even though the user adjusted the color conversion table to improve a color reproduction accuracy, which means the degree to which the color is accurately reproduced, the intended adjustment effect may not be obtained due to a black point compensation performed in print control processing by the color management system.

The problems as described above are not limited to the adjustment of the profile for the ink jet printer, but also exist for the adjustment of the profile for various color devices.

SUMMARY

The present disclosure includes an aspect directed to a profile adjustment method for adjusting a profile used in color conversion processing for performing a black point compensation, that is color conversion processing from input coordinate values in an input color space dependent on an input device to output coordinate values in an output color space dependent on an output device, the method including: an adjustment target profile reception step of receiving any one of an input profile representing a correspondence relationship between the input coordinate values and device independent coordinate values in a profile connection space and an output profile representing a correspondence relationship between the device independent coordinate values and the output coordinate values as an adjustment target profile; a black point information storage step of obtaining black point information from a color conversion table and storing the black point information in a private tag when the black point information representing a black point in the color conversion table is not stored in the private tag of the adjustment target profile before adjusting the color conversion table stored in the adjustment target profile; and an adjustment reception step of receiving an adjustment of the color conversion table.

The present disclosure includes an aspect directed to a color conversion method for performing a black point compensation in color conversion processing from input coordinate values in an input color space dependent on an input device to output coordinate values in an output color space dependent on an output device, the method including: an adjustment target profile reception step of receiving any one of an input profile representing a correspondence relationship between the input coordinate values and device independent coordinate values in a profile connection space and an output profile representing a correspondence relationship between the device independent coordinate values and the output coordinate values as an adjustment target profile; a black point information storage step of obtaining black point information from a color conversion table and storing the black point information in a private tag when the black point information representing a black point in the color conversion table is not stored in the private tag of the adjustment target profile before adjusting the color conversion table stored in the adjustment target profile; an adjustment reception step of receiving an adjustment of the color conversion table; and a color conversion step of converting the input coordinate values into the device independent coordinate values with reference to the input profile and converting the device independent coordinate values into the output coordinate values with reference to the output profile, as the color conversion processing for performing the black point compensation, in which in the color conversion step, when the black point information is stored in the private tag of the adjustment target profile, the black point compensation based on the black point information is performed in the color conversion processing.

The present disclosure includes an aspect directed to a color conversion apparatus including units corresponding to the respective steps of the profile adjustment method described above.

The present disclosure includes an aspect directed to a profile adjustment apparatus including units corresponding to the respective steps of the color conversion method described above.

The present disclosure includes an aspect directed to a color conversion program that causes a computer to realize functions corresponding to the respective steps of the profile adjustment method described above.

The present disclosure includes an aspect directed to a profile adjustment program that causes a computer to realize functions corresponding to the respective steps of the color conversion method described above.

BRIEF DESCRIPTION OF THE DRAWINGS

FIGS. 4A and 48 are diagrams schematically showing examples of a black point compensation in a profile connection space.

FIG. 5A is a diagram schematically showing a structure example of an A2B table of an input profile, and FIG. 5B is a diagram schematically showing a structure example of a B2A table of an output profile.

DESCRIPTION OF EXEMPLARY EMBODIMENTS

Figure 1:
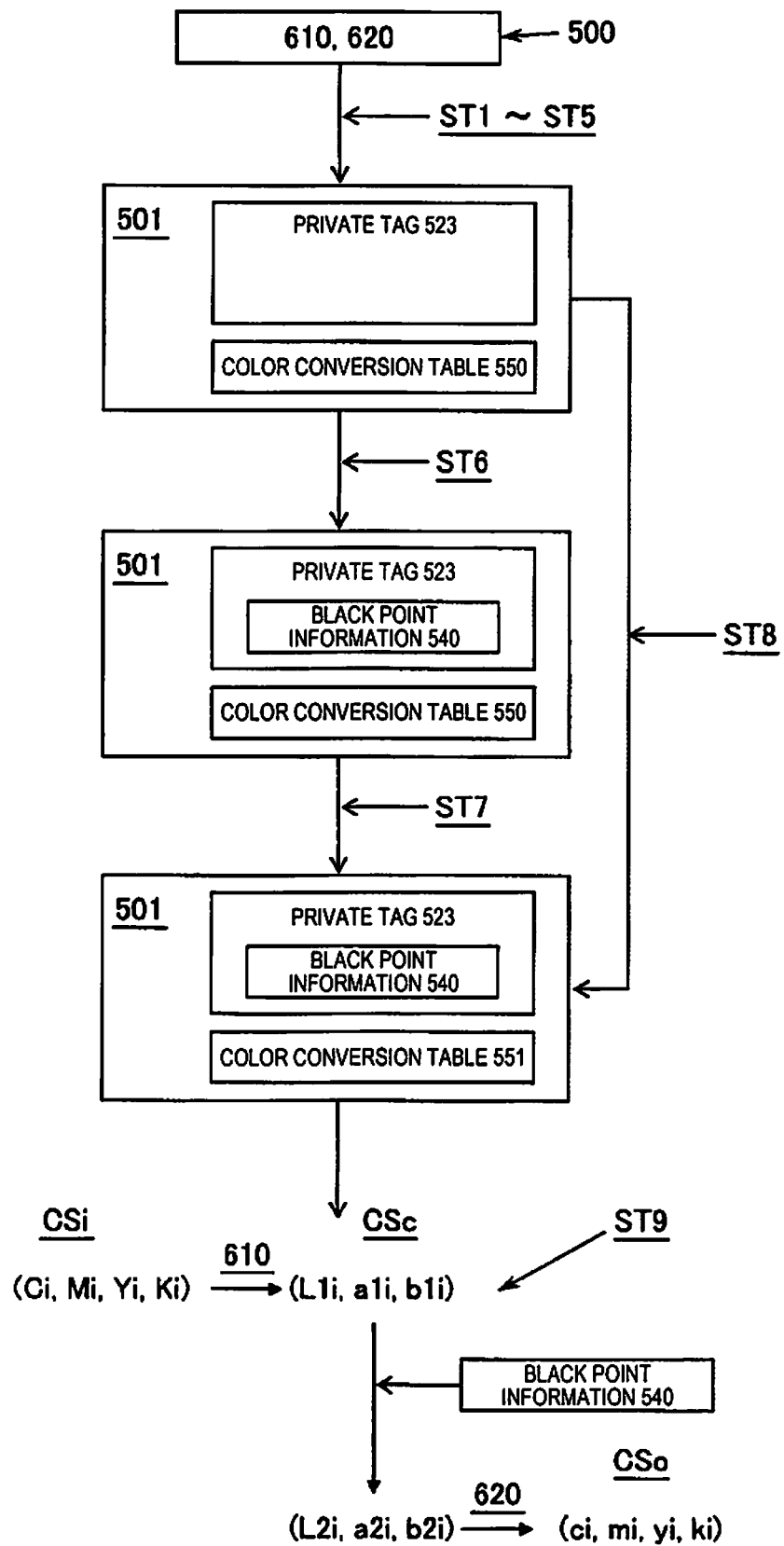
FIG. 1 is a diagram schematically showing an example of the flow of adjusting a profile and performing color conversion processing.

Hereinafter, an embodiment of the present disclosure will be described. Of course, the following embodiment merely illustrates the present disclosure, and not all the features shown in the embodiment are essential to the solution of the disclosure.

1. Outline of Technology Included in Present Disclosure:

First, an outline of a technology included in the present disclosure will be described with reference to examples shown in FIGS. 1 to 10. Note that the drawings of the present application are diagrams schematically showing examples, and the enlargement factors in each direction shown in these drawings may be different, and the drawings may not be consistent. Of course, each element of the present technology is not limited to the concrete examples indicated by reference numerals. In "outline of technology included in present disclosure", the parenthesis means a supplementary explanation of the immediately preceding word.

Aspect 1

Figure 3:
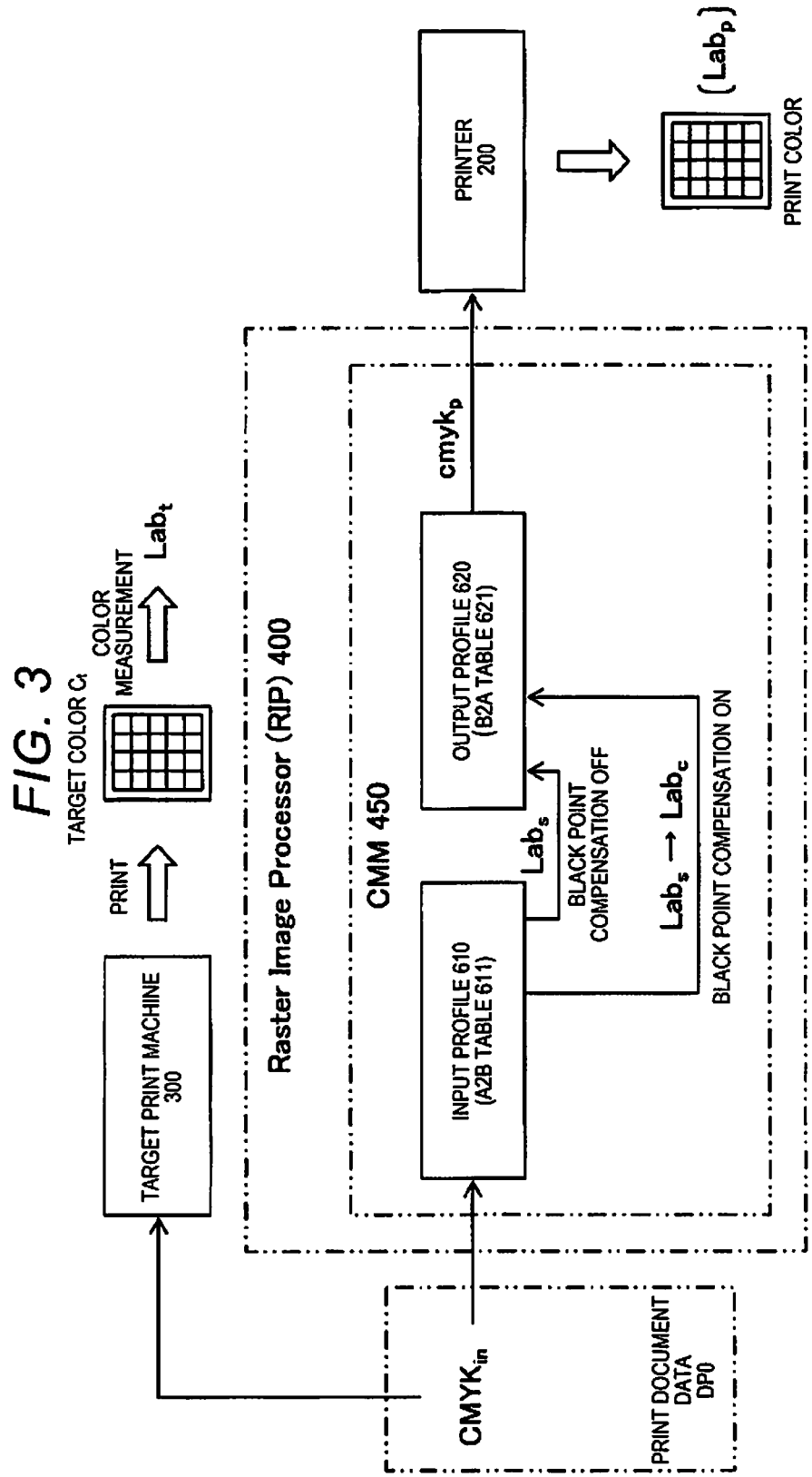
FIG. 3 is a diagram schematically showing an example of a color management flow.
Figure 8:
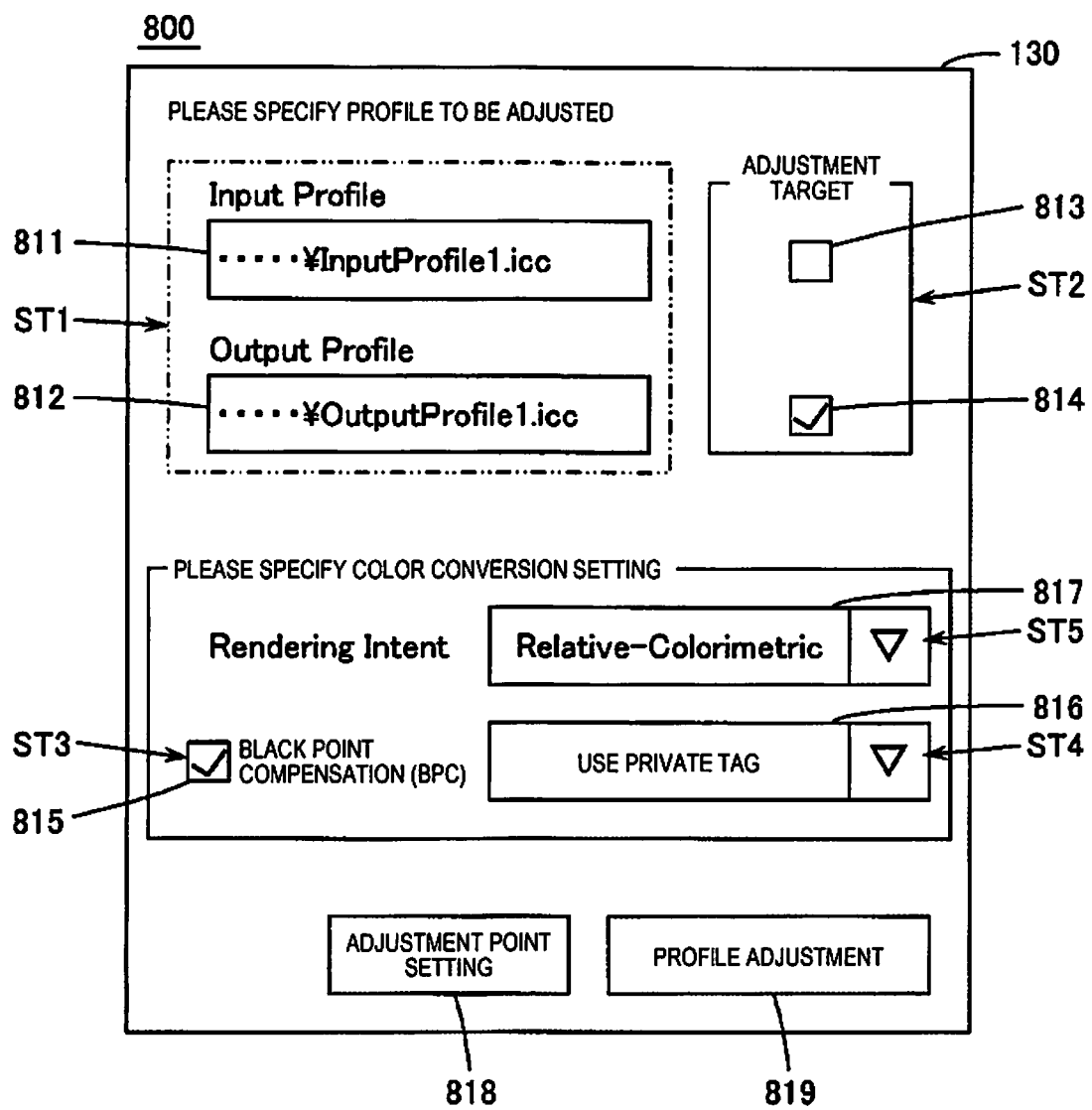
FIG. 8 is a diagram schematically showing an example of a user interface screen.

As illustrated in FIGS. 1, 3, 8, or the like, a profile adjustment method according to an aspect of the present technology is color conversion processing from input coordinate values (for example, ($C_i$, $M_i$, $Y_i$, $K_i$) illustrated in FIG. 1) in an input color space $CS_i$ dependent on an input device (for example, a target print machine 300 illustrated in FIG. 3) to output coordinate values (for example, ($c_i$, $m_i$, $y_i$, $k_i$) illustrated in FIG. 1) in an output color space $CS_o$ dependent on an output device (for example, a printer 200 illustrated in FIG. 3), and adjusts a profile 500 used in color conversion processing for performing a black point compensation. The present profile adjustment method includes an adjustment target profile reception step ST2, a black point information storage step ST6, and an adjustment reception step ST7. In the adjustment target profile reception step ST2, one of an input profile 610 representing a correspondence relationship between the input coordinate values and the device independent coordinate values (for example, Lab values) in a profile connection space $CS_c$ and an output profile 620 representing a correspondence relationship between the device independent coordinate values and the output coordinate values, is received as an adjustment target profile 501. In the black point information storage step ST6, before adjusting a color conversion table 550 stored in the adjustment target profile 501, and when black point information 540 representing a black point in the color conversion table 550 is not stored in a private tag 523 of the adjustment target profile 501, the black point information 540 is obtained from the color conversion table 550 and stored in the private tag 523. In the adjustment reception step ST7, an adjustment of the color conversion table 550 is received.

In the above-described aspect 1, the black point information 540 representing a black point in the color conversion table 550 before an adjustment is stored in the private tag 523 of the adjustment target profile 501. If a black point compensation based on the black point information 540 is performed in the color conversion processing when the black point information 540 is stored in the private tag 523 of the adjustment target profile 501, a user can assume the same black point compensation effect as before an adjustment of the color conversion table 550 even if the color conversion table 550 of the adjustment target profile 501 is adjusted to change the black point. Therefore, the present aspect can provide a profile adjustment method capable of adjusting a profile efficiently.

Here, an input color space dependent on an input device includes a CMYK color space, a CMY color space, an RGB color space, or the like. R means red, G means green, and B means blue.

An output color space dependent on an output device includes a CMYK color space, a CMY color space, an RGB color space, or the like.

A profile connection space includes a color space such as a CIE Lab color space, a CIE XYZ color space, or the like.

The above-mentioned appendage is applied also in the following aspects.

Aspect 2

As illustrated in FIGS. 1, 8, or the like, the present profile adjustment method may further include a profile reception step ST1 for receiving specifications of the input profile 610 and the output profile 620 used for the color conversion processing. In this aspect, it is possible to provide a technology for improving convenience since a user can select the input profile 610 and the output profile 620 used for the color conversion processing.

Aspect 3

Figure 9:
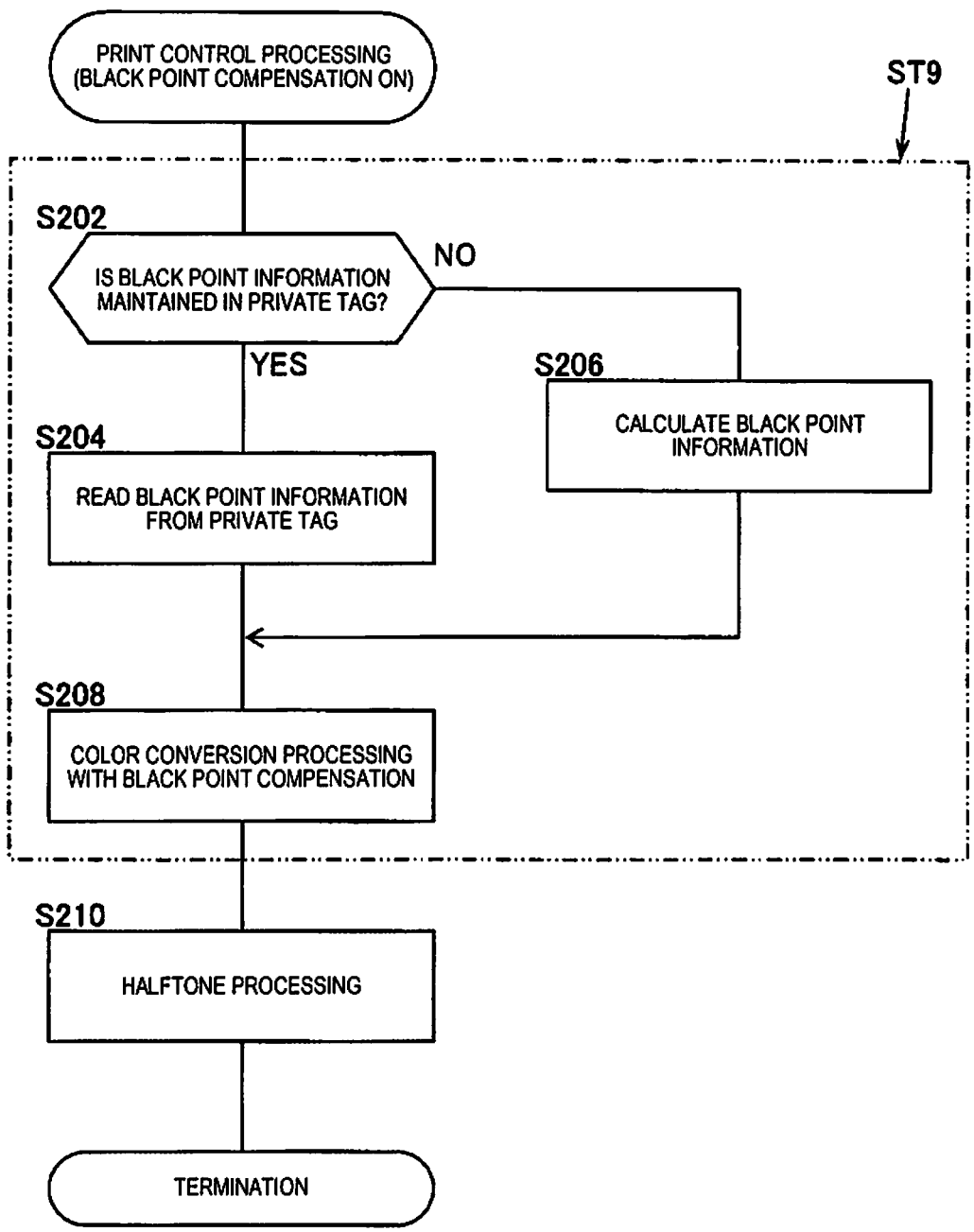
FIG. 9 is a flowchart showing an example of print control processing.

As illustrated in FIG. 9, in the color conversion processing, a black point compensation may be performed when a setting is to perform a black point compensation. As illustrated in FIG. 8 or the like, the present profile adjustment method may further include a compensation selection reception step ST3 for receiving a selection as to whether or not to make the setting to perform a black point compensation in the color conversion processing. In the present aspect, it is possible to provide a technology for improving convenience since a user can select whether or not to perform a black point compensation at the time of the color conversion.

Aspect 4

Figure 7:
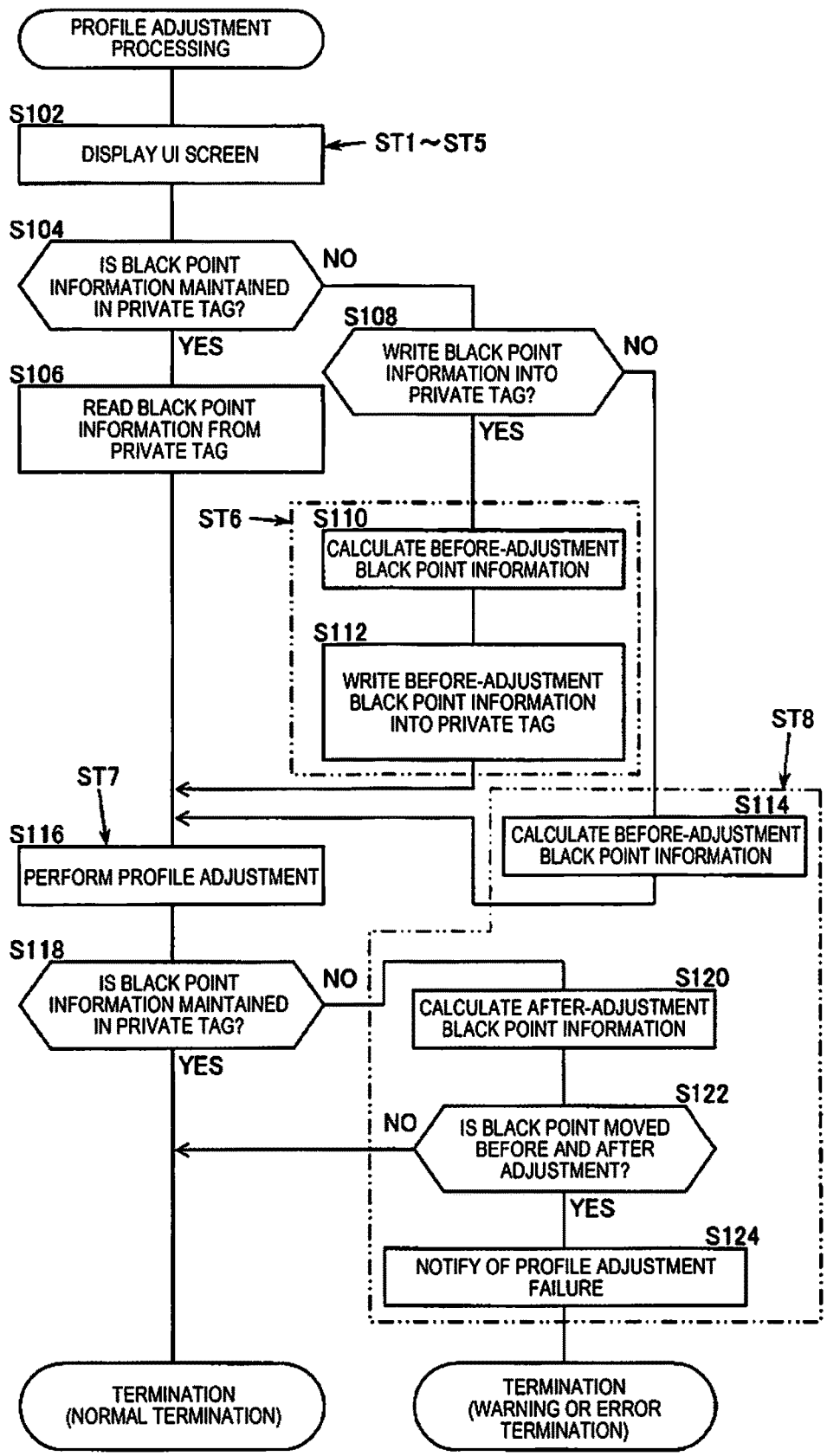
FIG. 7 is a flowchart showing an example of profile adjustment processing.

As illustrated in FIGS. 1, 8, or the like, the present profile adjustment method may further include a storage selection reception step ST4 for receiving a selection as to whether or not the black point information 540 is stored in the private tag 523 of the adjustment target profile 501. As illustrated in FIG. 7, in the present profile adjustment method, when the selection to store the black point information 540 is received, the black point information 540 may be stored in the private tag 523 of the adjustment target profile 501 in the black point information storage step ST6. In the present aspect, it is possible to provide a technology for improving convenience since a user can select whether or not to store the black point information 540 before an adjustment of the color conversion table in the private tag 523 of the adjustment target profile 501.

Aspect 5

As illustrated in FIGS. 1 and 7, in a case where the black point information 540 is not stored in the private tag 523 of the adjustment target profile 501 after an adjustment of the color conversion table 550, the present profile adjustment method may further include an output step ST8 for outputting mismatch information (for example, information notified in step S124 in FIG. 7) representing that before-adjustment black point information and after-adjustment black point information are different when the before-adjustment black point information representing a black point in the color conversion table before an adjustment (reference numeral 550 for convenience in FIG. 1) and the after-adjustment black point information representing a black point in the color conversion table after an adjustment (reference numeral 551 for convenience in FIG. 1) are different. In this aspect, it is possible to provide a technology capable of adjusting a profile efficiently since a user can know that an intended adjustment effect cannot be obtained by a fluctuation of a black point when the black point information 540 is not stored in the private tag 523 of the adjustment target profile 501.

Here, the mismatch information includes warning information, error information, or the like. The above-mentioned appendage is applied also in the following aspects.

Aspect 6

As illustrated in FIG. 8 or the like, the present profile adjustment method may include an intent reception step ST5 for receiving any one of a plurality of rendering intents as a specified intent. In the black point information storage step ST6 and the adjustment reception step ST7 illustrated in FIGS. 1 and 7, a table corresponding to the specified intent may be used as the color conversion table 550. In the present aspect, it is possible to provide a technique for improving convenience since a user can specify a rendering intent of the color conversion table 550 to be used.

Here, "perceptual", "media-relative colorimetric", "absolute colorimetric", and "saturation" are included in a plurality of rendering intents, for example.

For example, two or more types of rendering intents may be specified among these four types of rendering intents.

Aspect 7

Figure 2:
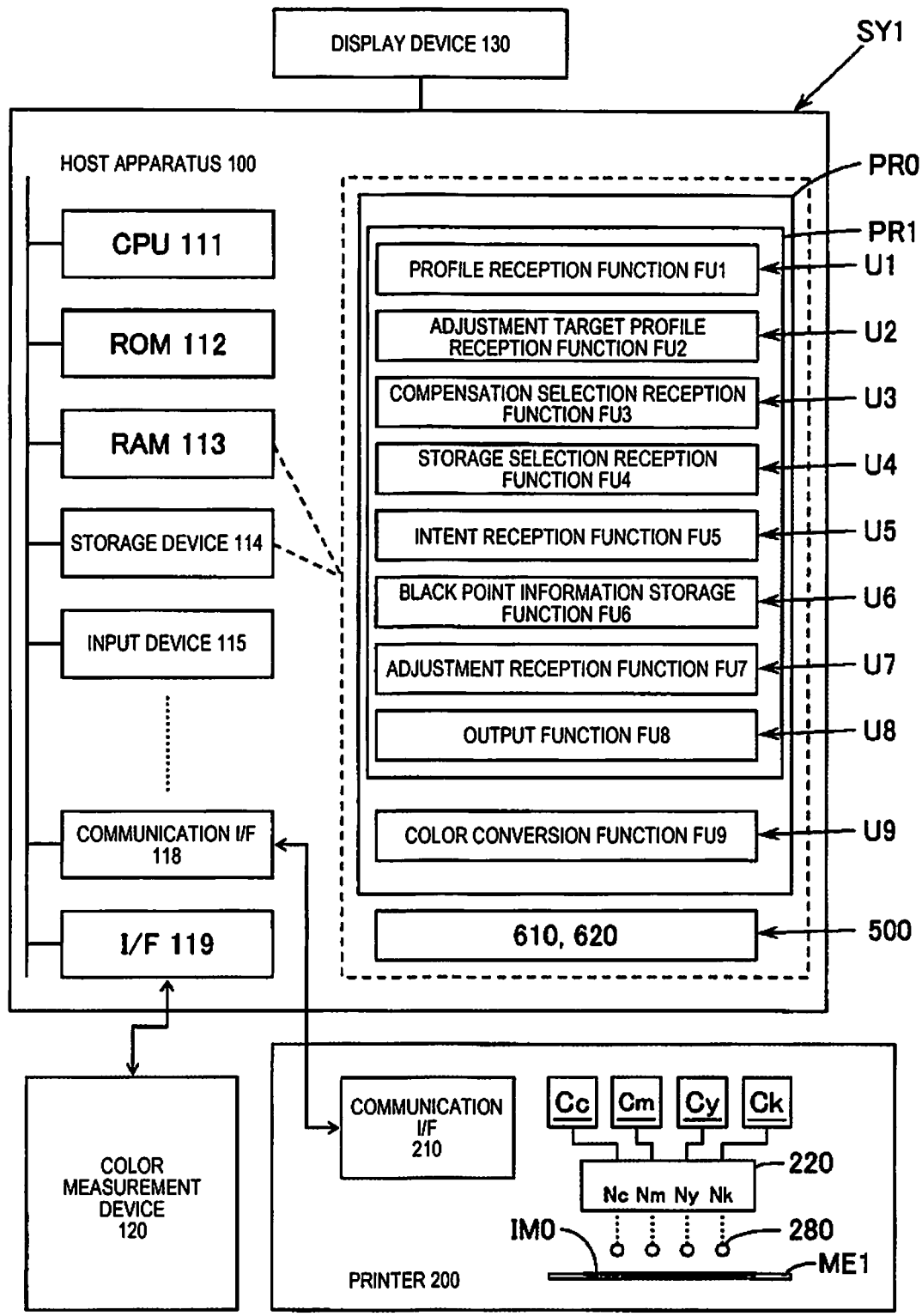
FIG. 2 is a block diagram schematically showing a configuration example of a system that adjusts the profile and performs the color conversion processing.

By the way, as illustrated in FIG. 2, a profile adjustment apparatus (for example, a host apparatus 100) according to one aspect of the present technology includes an adjustment target profile reception unit U2 corresponding to the adjustment target profile reception step ST2, a black point information storage unit U6 corresponding to the black point information storage step ST6, and an adjustment reception unit U7 corresponding to the adjustment reception step ST7. The present aspect can provide a profile adjustment apparatus capable of adjusting profile efficiently. The present profile adjustment apparatus may include a profile reception unit U1 corresponding to the profile reception step ST1, a compensation selection reception unit U3 corresponding to the compensation selection reception step ST3, a storage selection reception unit U4 corresponding to the storage selection reception step ST4, an intent reception unit U5 corresponding to the intent reception step ST5, and an output unit U8 corresponding to the output step ST8.

Aspect 8

Further, as illustrated in FIG. 2, a profile adjustment program PR1 according to one aspect of the present technology causes a computer (for example, the host apparatus 100) to realize an adjustment target profile reception function FU2 corresponding to the adjustment target profile reception step ST2, a black point information storage function FU6 corresponding to the black point information storage step ST6, and an adjustment reception function FU7 corresponding to the adjustment reception step ST7. The present aspect can provide a profile adjustment program capable of adjusting a profile efficiently. The present profile adjustment program PR1 may cause a computer to realize a profile reception function FU1 corresponding to the profile reception step ST1, a compensation selection reception function FU3 corresponding to the compensation selection reception step ST3, a storage selection reception function FU4 corresponding to the storage selection reception step ST4, an intent reception function FU5 corresponding to the intent reception step ST5, and an output function FU8 corresponding to the output step ST8.

Aspect 9

Furthermore, the present technology also has an aspect of a color conversion method with a black point compensation. As illustrated in FIGS. 1, 3, 8, or the like, the color conversion method according to one aspect of the present technology performs a black point compensation, in the color conversion processing from the input coordinate values (for example, $(C_i, M_i, Y_i, K_i)$ illustrated in FIG. 1) in the input color space $CS_i$ dependent on the input device (for example, a target print machine 300 illustrated in FIG. 3) to the output coordinate values (for example, $(c_i, m_i, y_i, k_i)$ illustrated in FIG. 1) in the output color space $CS_o$ dependent on the output device (for example, the printer 200 illustrated in FIG. 3). The present color conversion method includes the adjustment target profile reception step ST2, the black point information storage step ST6, the adjustment reception step ST7, and a color conversion step ST9. In the adjustment target profile reception step ST2, one of the input profile 610 representing the correspondence relationship between the input coordinate values and the device independent coordinate values (for example, Lab values) in the profile connection space $CS_c$ and the output profile 620 representing the correspondence relationship between the device independent coordinate values and the output coordinate values, is received as an adjustment target profile 501. In the black point information storage step ST6, before adjusting a color conversion table 550 stored in the adjustment target profile 501, and when black point information 540 representing a black point in the color conversion table 550 is not stored in a private tag 523 of the adjustment target profile 501, the black point information 540 is obtained from the color conversion table 550 and stored in the private tag 523. In the adjustment reception step ST7, an adjustment of the color conversion table 550 is received. In the color conversion step ST9, as the color conversion processing for performing a black point compensation, the input coordinate values are converted to the device independent coordinate values with reference to the input profile 610, and the device independent coordinate values are converted to the output coordinate values with reference to the output profile 620. In the color conversion step ST9, a black point compensation based on the black point information 540 is performed in the color conversion processing when the black point information 540 is stored in the private tag 523 of the adjustment target profile 501 (input profile 610 or output profile 620).

In the above-described aspect 9, the black point information 540 representing a black point in the color conversion table 550 before an adjustment is stored in the private tag 523 of the adjustment target profile 501, and when the black point information 540 is stored in the private tag 523 of the adjustment target profile 501, a black point compensation based on the black point information 540 is performed in the color conversion processing. Thereby, a user can assume the same black point compensation effect as before an adjustment of the color conversion table 550 even if the color conversion table 550 of the adjustment target profile 501 is adjusted to change the black point. Therefore, the present aspect can provide a color conversion method capable of adjusting a profile efficiently to perform a color conversion.

Aspect 10

As illustrated in FIG. 2, a color conversion apparatus (for example, the host apparatus 100) according to one aspect of the present technology includes an adjustment target profile reception unit U2 corresponding to the adjustment target profile reception step ST2, a black point information storage unit U6 corresponding to the black point information storage step ST6, an adjustment reception unit U7 corresponding to the adjustment reception step ST7, and a color conversion unit U9 corresponding to the color conversion step ST9. The present aspect can provide a color conversion apparatus capable of adjusting a profile efficiently to perform a color conversion. The present color conversion apparatus may include a profile reception unit U1 corresponding to the profile reception step ST1, a compensation selection reception unit U3 corresponding to the compensation selection reception step ST3, a storage selection reception unit U4 corresponding to the storage selection reception step ST4, an intent reception unit U5 corresponding to the intent reception step ST5, and an output unit U8 corresponding to the output step ST8.

Aspect 11

Further, as illustrated in FIG. 2, a color conversion program PR0 according to one aspect of the present technology causes a computer (for example, the host apparatus 100) to realize an adjustment target profile reception function FU2 corresponding to the adjustment target profile reception step ST2, a black point information storage function FU6 corresponding to the black point information storage step ST6, an adjustment reception function FU7 corresponding to the adjustment reception step ST7, and the color conversion function FU9 corresponding to the color conversion step ST9. The present aspect can provide a color conversion program capable of adjusting a profile efficiently to perform a color conversion. The present color conversion program PR0 may cause a computer to realize a profile reception function FU1 corresponding to the profile reception step ST1, a compensation selection reception function FU3 corresponding to the compensation selection reception step ST3, a storage selection reception function FU4 corresponding to the storage selection reception step ST4, an intent reception function FU5 corresponding to the intent reception step ST5, and an output function FU8 corresponding to the output step ST8.

Furthermore, the present technology can be applied to a control method of a profile adjustment apparatus, a control method of a color conversion apparatus, a composite system including the profile adjustment apparatus, a composite system including the color conversion apparatus, a control method of these composite systems, a control program for the profile adjustment apparatus, a control program for the color conversion apparatus, a control program for the above-described composite systems, a computer readable medium having a profile adjustment program or a color conversion program or the above-described control programs recorded, or the like. The above-described apparatuses may be configured with a plurality of distributed portions.

2. Outline of Color Conversion Method Including Profile Adjustment Method According to Concrete Example:

FIG. 1 schematically illustrates a flow of adjusting the profile 500 and performing color conversion processing. Although details will be described later, FIG. 2 schematically illustrates a configuration of a system SY1 that adjusts the profile 500 and performs the color conversion processing. FIG. 3 schematically illustrates a color management flow.

The profile adjustment method shown in FIG. 1 includes the profile reception step ST1, the adjustment target profile reception step ST2, the compensation selection reception step ST3, the storage selection reception step ST4, the intent reception step ST5, the black point information storage step ST6, the adjustment reception step ST7, and, the output step ST8. The color conversion method shown in FIG. 1 includes the color conversion step ST9 in addition to the steps ST1 to ST8 described above.

The profile 500 shown in FIG. 1 includes an input profile 610 and an output profile 620. In the profile reception step ST1, processing of receiving specifications of the input profile 610 and the output profile 620 used for the color conversion processing is performed. In the adjustment target profile reception step ST2, processing of receiving one of the input profile 610 and the output profile 620 as an adjustment target profile 501 is performed. In the compensation selection reception step ST3, processing of receiving a selection as to whether or not to perform setting of a black point compensation in the color conversion processing is performed. Here, the outline will be described on the assumption that the selection for setting to perform a black point compensation in the color conversion process is received. In the storage selection reception step ST4, processing of receiving a selection as to whether or not the black point information 540 is stored in the private tag 523 of the adjustment target profile 501 is performed. In the intent reception step ST5, processing of receiving any one of a plurality of rendering intents as a specified intent is performed. In the adjustment target profile 501, a color conversion table 550 is stored for each rendering intent. In the following steps, the color conversion table 550 corresponding to the specified intent is used for processing, and the processing is performed according to the specified intent.

Here, a case where a selection to store the black point information 540 in the private tag 523 in the storage selection reception step ST4 will be described.

In the black point information storage step ST6, processing of obtaining the black point information 540 from the color conversion table 550 and storing the information in the private tag 523 is performed when the black point information 540 is not stored in the private tag 523 before an adjustment of the color conversion table 550 in the adjustment target profile 501. The black point information 540 is information representing a black point in the color conversion table 550, and is represented by, for example, XYZ values which are coordinate values in an XYZ color space for each rendering intent.

The calculation method of the XYZ values of a black point is defined for each rendering intent in ISO 18619 (black point compensation) created by ISO/TC130/WG7 N69. Therefore, processing in which only the XYZ values of the black point corresponding to the specified intent are stored in the private tag 523 may be performed, or processing in which the XYZ values of the black point corresponding to entire rendering intents are stored in the private tag 523 may be performed.

In the adjustment reception step ST7, processing of receiving an adjustment of the color conversion table 550 of the adjustment target profile 501 is performed. In FIG. 1, the color conversion table after an adjustment is indicated by reference numeral 551 for the sake of convenience. Since the color conversion table 551 after an adjustment becomes the color conversion table before an adjustment in a next profile adjustment, it is included in the color conversion table 550 of the aspects 1 to 11 described above.

Next, a case where a selection not to store the black point information 540 in the private tag 523 in the storage selection reception step ST4 will be described. In the output step ST8, in a case where the black point information 540 is not stored in the private tag 523 of the adjustment target profile 501 after an adjustment of the color conversion table 550, processing of outputting the mismatch information is performed when the before-adjustment black point information and the after-adjustment black point information are different. The before-adjustment black point information is information representing a black point in the color conversion table 550 before an adjustment. The after-adjustment black point information is information representing a black point in the color conversion table 551 after an adjustment. The mismatch information is information representing that the before-adjustment black point information and the after-adjustment black point information are different.

In the color conversion step ST9, first, as the color conversion processing for performing a black point compensation, processing of converting input coordinate values into device independent coordinate values with reference to the input profile 610 is performed. In the example of FIG. 1, the input coordinate values are the CMYK values ($C_i$, $M_i$, $Y_i$, $K_i$), and the device independent coordinate values are the Lab values ($L1_i$, $a1_i$, $b1_1$). Here, a variable i is a variable that identifies the CMYK values. Next, processing of performing a black point compensation based on the black point information 540 in the profile connection space, which is a device independent color space, is performed. When the black point information is stored in the private tag 523 of the input profile 610, the black point information stored in the private tag 523 is used for a black point compensation. When the black point information 540 is stored in the private tag 523 of the output profile 620, the black point information stored in the private tag 523 is used for a black point compensation. In the example of FIG. 1, it is shown that the device independent coordinate values before a black point compensation are Lab values ($L1i$, $a1_i$, $b1_i$) and the device independent coordinate values after a black point compensation are Lab values ($L2_i$, $a2_i$, $b2_i$). Furthermore, processing of converting device independent coordinate values into output coordinate values with reference to the output profile 620 is performed. In the example of FIG. 1, it is shown that the device independent coordinate values are the Lab values ($L2_i$, $a2_i$, $b2_i$) and the output coordinate values are cmyk values ($c_i$, $m_i$, $y_i$, $k_i$).

As described above, a user can assume the same black point compensation effect as before an adjustment of the color conversion table 550 even if the color conversion table 550 of the adjustment target profile 501 is adjusted to change the black point.

3. Concrete Example of System Configuration for Performing Color Conversion Processing by Adjusting Profile:

The system SY1 shown in FIG. 2 includes a host apparatus 100, which is an example of a color conversion apparatus including a profile adjustment apparatus, a display device 130, a color measurement device 120, and an ink jet printer 200. A CPU 111, a ROM 112, a RAM 113, a storage device 114, an input device 115, a communication I/F 118, a color measurement device I/F 119, and the like are connected to the host apparatus 100, and information can be input to and output from each other. Here, the CPU is an abbreviation of a central processing unit, the ROM is an abbreviation of a read only memory, the RAM is an abbreviation of a random access memory, and the I/F is an abbreviation of interface. The ROM 112, the RAM 113, and the storage device 114 are memories, and at least the ROM 112 and the RAM 113 are semiconductor memories. The display device 130 displays a screen corresponding to the display data based on display data from the host apparatus 100. For the display device 130, a liquid crystal display panel or the like can be used.

The storage device 114 stores an OS (not shown), a color conversion program PR0 including a profile adjustment program PR1, a profile 500 including an input profile 610 and an output profile 620, and the like. These are appropriately read into the RAM 113 and used for profile adjustment processing and color conversion processing. Here, the OS is an abbreviation of an operating system. As the storage device 114, a nonvolatile semiconductor memory such as a flash memory, a magnetic storage device such as a hard disk, or the like can be used.

As the input device 115, a pointing device, a hard key including a keyboard, a touch panel attached to a surface of a display panel, or the like can be used. The communication I/F 118 is connected to a communication I/F 210 of a printer 200, and inputs and outputs information such as print data to the printer 200. The color measurement device I/F 119 is connected to the color measurement device 120, and obtains color measurement data including a color measurement value from the color measurement device 120. As the standards of the I/Fs 118, 119, and 210, a USB, a short distance wireless communication standard, or the like can be used. Here, the USB is an abbreviation of a universal serial bus. The communication of the communication I/Fs 118, 119, and 210 may be wired or wireless, or may be a network communication such as using a LAN or using the Internet. Here, the LAN is an abbreviation of a local area network.

The color measurement device 120 can measure each color patch formed on print substrate ME1 which is an example of a medium on which a color chart is formed or each color patch of the color chart displayed on the display device (not shown), and output a color measurement value. The patch is also called a color chip. The color measurement values are, for example, values representing a lightness L and chromaticity coordinates a and b in the CIE Lab color space. The host apparatus 100 acquires color measurement data from the color measurement device 120 and performs various processing.

The profile adjustment program PR1 shown in FIG. 2 causes the host apparatus 100 to realize a profile reception function FU1, an adjustment target profile reception function FU2, a compensation selection reception function FU3, a storage selection reception function FU4, an intent reception function FU5, a black point information storage function FU6, an adjustment reception function FU7, and output function FU8. The color conversion program PR0 causes the host apparatus 100 to realize the above-described functions FU1 to FU8 and the color conversion function FU9.

The CPU 111 of the host apparatus 100 appropriately reads the information stored in the storage device 114 into the RAM 113, and performs various processing by executing the read program. The CPU 111 performs processing corresponding to the above-described functions FU1 to FU9 by executing the color conversion program PR0 including the profile adjustment program PR1 read into the RAM 113. The color conversion program PR0 including the profile adjustment program PR1 causes the host apparatus 100 which is a computer, to function as a profile reception unit U1, an adjustment target profile reception unit U2, a correction selection reception unit U3, a storage selection reception unit U4, an intent reception unit U5, a black point information storage unit U6, an adjustment reception unit U7, an output unit U8, and a color conversion unit U9. Further, the host apparatus 100 that executes the color conversion program PR0 including the profile adjustment program PR1 performs a profile reception step ST1, an adjustment target profile reception step ST2, a correction selection reception step ST3, a storage selection reception step ST4, an intent reception step ST5, a black point information storage step ST6, an adjustment reception step ST7, an output step ST8, and a color conversion step ST9. The profile adjustment program PR1 for realizing the above-described functions FU1 to FU8 on a computer and a computer readable medium storing the color conversion program PR0 for realizing the above-described functions FU1 to FU9 on a computer are not limited to the storage device inside the host apparatus, and may be a recording medium outside the host apparatus.

The host apparatus 100 includes a computer such as a personal computer including a tablet terminal. For example, when a main body of the desktop-type personal computer is applied to the host apparatus 100, normally, the display device 130, the color measurement device 120, and the printer 200 are connected to the main body. When a display device integrated-type computer such as a notebook-type personal computer is applied to the host apparatus 100, normally, the color measurement device 120 and the printer 200 are connected to the computer. Even in a display device integrated-type host apparatus, it is the same as outputting display data to an internal display device. Further, the host apparatus 100 may have all the configuration components 111 to 119 in one case, but may be configured with a plurality of devices communicably divided from one another. Furthermore, even if at least a part of the display device 130, the color measurement device 120, and the printer 200 are present in the host apparatus 100, the present technology can be performed.

It is assumed that the printer 200 shown in FIG. 2 is an ink jet printer that discharges at least C ink, M ink, Y ink, and K ink as a color material from a recording head 220 to form an output image IM0 corresponding to print data. The recording head 220 receives C, M, Y, and K ink from ink cartridges $C_c$, $C_m$, $C_y$, and $C_k$, respectively, and ink droplets 280 of C, M, Y, and K are ejected from nozzles $N_c$, $N_m$, $N_y$, and $N_k$, respectively. When the ink droplets 280 land on the print substrate ME1, ink dots are formed on the print substrate ME1. As a result, a printed matter having an output image IM0 on the print substrate ME1 is obtained. When a profile representing the color reproduction characteristics of the printer 200 is created, a color chart having patches corresponding to the color of each grid point may be formed on the print substrate ME1 by the printer 200. A color conversion table having color measurement values of each patch is used for creating a profile as an A2B table.

4. Concrete Example of Color Management System:

Next, an example of a color management system to which the present technology can be applied will be described with reference to FIG. 3.

The color management system shown in FIG. 3, for example, converts print document data DP0 into output data representing a print color $cmyk_p$ using a RIP 400 realized in the above-described host apparatus 100, and causes the ink jet printer 200 to form a printed matter. Here, the RIP is an abbreviation of a raster image processor. The print document data DP0 represents process colors $CMYK_{in}$ for reproducing target colors $C_t$ targeted by CMYK color materials of the target print machine 300 which is an example of a color matching target apparatus.

In the target print machine 300, an offset print machine, a gravure print machine, a flexo print machine, or the like is illustrated. The target colors $C_t$ are represented, for example, with Lab values which are coordinate values in the CIE Lab color space. In FIG. 3, it is shown that the target print machine 300 prints a color chart representing the target color $C_t$ on the print substrate, and the color measurement device measures each color patch of the color chart to obtain a color measurement value $Lab_t$. The process colors $CMYK_{in}$ correspond to the amount of use of the CMYK ink used in the target print machine 300, and represent coordinates in the CMYK color space dependent on the target print machine 300.

The RIP 400 shown in FIG. 3 has a CMM 450 for performing the color conversion in which the print colors $cmyk_p$ are set to the target colors $C_t$. Here, the CMM is an abbreviation of a color management module. The CMM 450 refers to the input profile 610 and the output profile 620 to perform the color conversion processing that converts the process colors $CMYK_{in}$ into the print colors $cmyk_p$, and causes a computer to realize processing that makes the printer 200 to print. The input profile 610 is a file that describes the color characteristics of the ink used in the target print machine 300. The output profile 620 is a file that describes the color characteristics of the ink used in the printer 200. In these profiles 610 and 620, for example, a data format of the ICC profile can be used.

Since black points in the color gamut of an input device such as the target print machine 300 and black points in the color gamut of an output device such as the ink jet printer 200 are usually different, a black point compensation may be performed in color conversion processing of print control processing by the CMM 450. In a case where the black point compensation is off, that is, in a case of setting not to perform the black point compensation, the process colors $CMYK_{in}$ of the print document data DP0 are converted to the colors $Lab_s$ in the Lab color space according to an A2B table 611 of the input profile 610, and the colors $Lab_s$ are converted to the print colors $cmyk_p$ according to a B2A table 621 of the output profile 620. In a case where the black point compensation is on, that is, in a case of setting to perform the black point compensation, the colors $Lab_s$ in the Lab color space converted from the process colors $CMYK_{in}$ are converted to the colors $Lab_c$ according to the black point compensation, and the colors $Lab_c$ are converted to the print colors $cmyk_p$ according to the B2A table 621 of the output profile 620.

When the printer 200 uses a total four color with CMYK, data representing the print colors $cmyk_p$ is output to the printer 200 and reproduced on a printed matter. In FIG. 3, it is shown that the printer 200 prints a color chart representing the print colors $cmyk_p$ on the print substrate. A color value of each color patch of the color chart is shown as $Lab_p$. When the printer 200 also uses an ink such as $L_c$, that is, a light cyan, $L_m$, that is, a light magenta, DY, that is, a dark yellow, and $L_k$, that is, a light black, the printer 200 can reproduce the print colors $cmyk_p$ on a printed matter if the RIP 400 or the printer 200 separates the print colors $cmyk_p$ into dark colors and light colors. The print colors themselves are not limited to a total four color with CMYK.

The RIP 400 also has an input profile for converting the process colors (denoted as $CMY_{in}$) which represent an amount of use of color materials of only the three primary colors CMY as a subtractive color mixture, the process colors (denoted as $RGB_{in}$) which represent intensity of the three primary colors RGB as an additive color mixture, or the like, and coordinate values in the Lab color space, other than the process colors $CMYK_{in}$. Therefore, the RIP 400 can also convert the process colors $CMY_{in}$, the process colors $RGB_{in}$, or the like into the print colors $cmyk_p$.

Figure 4A:
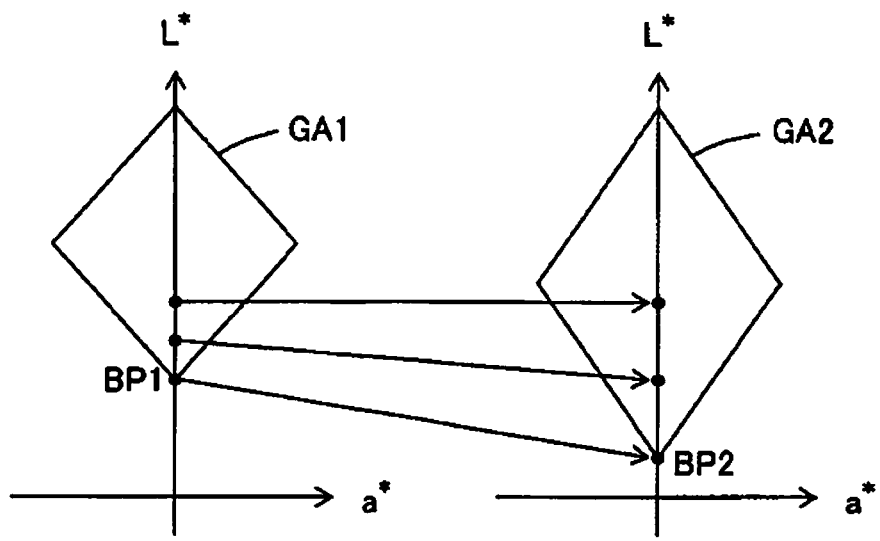
Figure 4B:
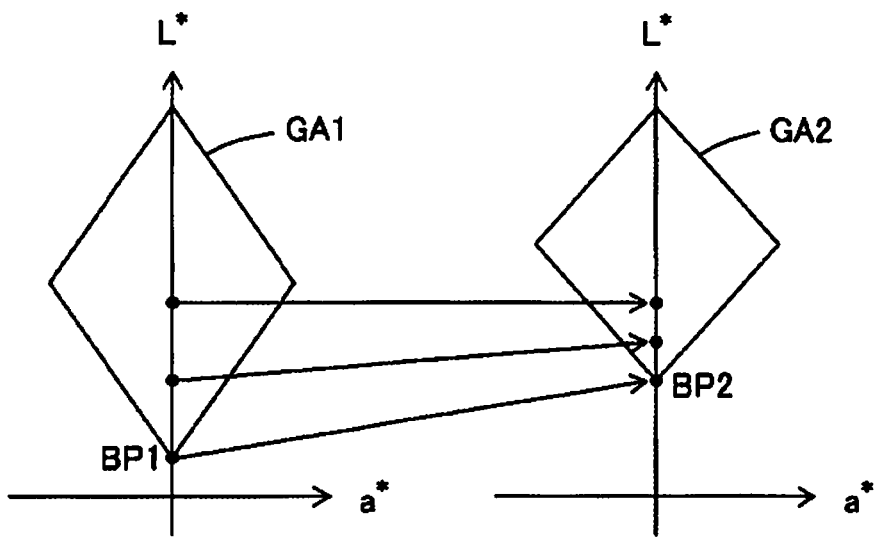

FIGS. 4A and 4B schematically illustrate a black point compensation in the Lab color space, which is a profile connection space. In FIGS. 4A and 4B, a horizontal axis indicates a value of a* as an example, a vertical axis indicates a lightness L*, a color gamut GA1 on a left side indicates a color gamut of the input device, and a color gamut GA2 on a right side indicates a color gamut of the output device. It is also possible to replace the horizontal axis with a value of b*.

FIG. 4A schematically shows an example of the black point compensation when a black point BP2 of the color gamut GA2 of the output device is outside the color gamut GA1 of the input device. In this case, if the black point compensation is not performed, the black point BP2 of the color gamut GA2 of the output device is not represented. In FIG. 4A, the black point BP2 is represented as the CMM 450 performs a black point compensation to darken the black point BP1 of the color gamut GA1 of the input device at the time of color conversion processing as shown by arrows connecting the color gamut GA1 and GA2, and an expressiveness of a dark portion of an output image is improved.

FIG. 4B schematically shows an example of the black point compensation when a black point BP1 of the color gamut GA1 of the input device is outside the color gamut GA2 of the output device. In this case, if the black point compensation is not performed, a portion darker than the black point BP2 is converted to the vicinity of the black point BP2 at the time of the color conversion processing in the color gamut GA1 of the input device, and the gradation of the dark portion of the output image collapses. In FIG. 4B, the gradation-collapse of the dark portion is eliminated as the CMM 450 performs a black point compensation to brighten the dark portion of the color gamut GA1 of the input device at the time of the color conversion processing as shown by arrows connecting the color gamuts GA1 and GA2.

The method of a black point compensation of the present concrete example is not particularly limited, and various known methods of a black point compensation such as a black point compensation of a method disclosed in JP-A-2009-219061 can be adopted.

5. Concrete Example of Profile:

FIG. 5A schematically illustrates the structure of the A2B table 611 stored in the input profile 610. The input profile 610 is data representing a correspondence relationship between the input coordinate values in the input color space $CS_i$ dependent on the input device and device independent coordinate values in a profile connection space $CS_c$. The input device includes a print machine such as an offset print machine or a gravure print machine or a flexo print machine, a display device, or the like. The A2B table 611 included in the input profile 610 shown in FIG. 5A and the B2A table (not shown), are data that define a correspondence relationship between the CMYK values ($C_i$, $M_i$, $Y_i$, $K_i$) in the CMYK color space and the Lab values ($L_i$, $a_i$, $b_i$) in the Lab color space in which the ink used in the target print machine is set. The grid points GD1 of the A2B table 611 are normally arranged in the CMYK color space at substantially equal intervals in a C-axis direction, an M-axis direction, a Y-axis direction, and a K-axis direction. Here, a variable i is a variable for identifying the grid points GD1 set in the CMYK color space. The CMYK values are examples of the input coordinate values, and the Lab values are examples of the device independent coordinate values.

FIG. 5A schematically illustrates the structure of the A2B table 611 stored in the input profile 610. The output profile 620 is data representing the correspondence relationship between the device independent coordinate values in the profile connection space $CS_c$ and the output coordinate values in the output color space $CS_o$ dependent on the output device. The output device includes a printer such as an ink jet printer, a display device, or the like. The B2A table 621 included in the output profile 620 shown in FIG. 5B and the A2B table (not shown) are data that define a correspondence relationship between the Lab values ($L_j$, $a_j$, $b_j$) in the Lab color space and the cmyk values ($c_j$, $m_j$, $y_j$, $k_j$) in the cmyk color space in which the ink used in the printer 200 is set. The expression "cmyk color space" is used to distinguish the color space in which the ink used in the printer 200 is set, from the color space in which the ink used in the target print machine is set. The grid points GD2 of the B2A table 621 are normally arranged in the Lab color space at substantially equal intervals in an L-axis direction, an a-axis direction, and a b-axis direction. Here, a variable j is a variable for identifying the grid points GD2 set in the Lab color space. The cmyk values are examples of the output coordinate values.

The color conversion tables included in the profiles 610 and 620 are not limited to a single conversion table, and the conversion table may be a plurality of combinations of conversion table such as a combination of one-dimensional conversion table and three-dimensional conversion table or a combination of four-dimensional conversion table and one-dimensional conversion table. Therefore, the color conversion table shown in FIGS. 5A and 5B may directly indicate a three-dimensional or a four-dimensional conversion table included in the profiles 610 and 620, or a state in which a plurality of conversion tables included in the profiles 610 and 620 are combined.

Further, the grid point means a virtual point arranged in the color space on the input side, and it is assumed that coordinate values on the output side corresponding to positions of grid points in the color space on the input side are stored in the grid points. Not only are a plurality of grid points evenly arranged in the color space on the input side, but it is also included in the present technology that the plurality of grid points are unevenly arranged in the color space on the input side.

When the printer 200 uses a total four color ink with CMYK, the cmyk values are transmitted to the printer 200 as it is or the cmyk values are converted into data for printing and transmitted to the printer 200, and the cmyk values are used for printing. When the printer 200 uses ink of five or more colors, the cmyk values are converted by a color separation table into data representing an amount of use of the ink of five or more colors, transmitted to the printer 200, and used for printing. In the ink colors of five or more colors, other than the CMYK, some or all of $L_c$ having a lower concentration than C, $L_m$ having a lower concentration than M, $D_y$ having a higher concentration than Y, $L_k$ having a lower concentration than K, and the like, are illustrated. The host apparatus 100 or the printer 200 can reproduce an image on the printed matter by separating the cmyk values into dark and light according to the color separation table. For example, when the printer 200 uses a total six color ink with C, M, Y, K, $L_c$, and $L_m$, the color separation table may be used in which gradation values representing an amount of an ink usage of each of C, M, Y, K, $L_c$, and $L_m$ are associated with coordinate values in the cmyk color space.

Figure 6:
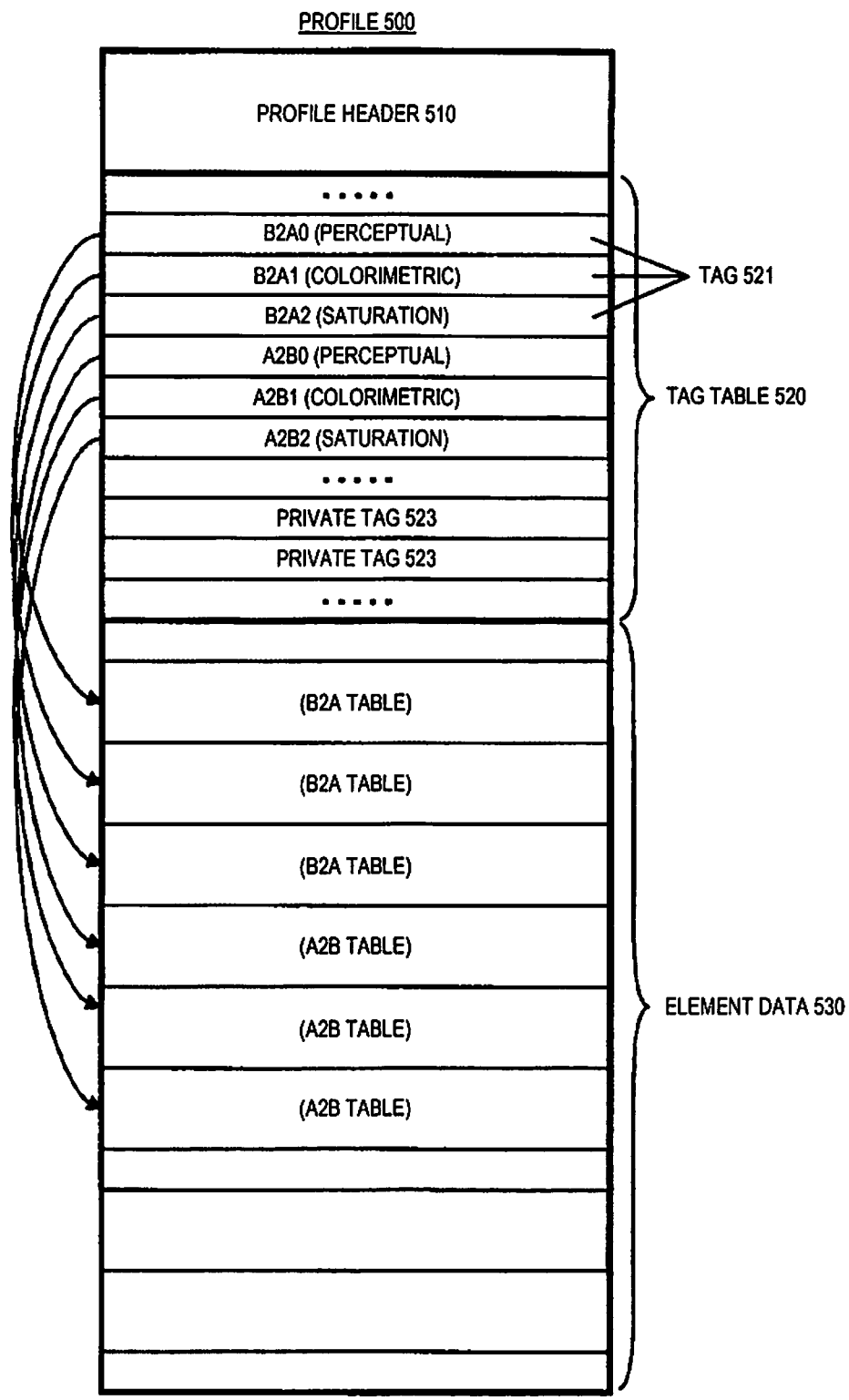
FIG. 6 is a diagram schematically showing a structure example of the profile.

FIG. 6 schematically illustrates the structure of the profile 500. The profile 500 shown in FIG. 6 is an ICC profile, and includes a profile header 510 and a tag table 520. The profile 500 includes a tag 521 which is information necessary for converting color information between the profile connection space and the device dependent color space. The tag 521 includes a private tag 523 for customizing the profile 500.

When the profile 500 is the input profile 610 or the output profile 620, an A2Bx tag for the device includes, as element data 530, an A2B table which is a color conversion table for converting coordinate values in a device dependent color space such as a CMYK color space or a cmyk color space to Lab values in the Lab color space. Here, x shown in FIG. 6 is zero, one or two. A B2Ax tag for the device includes, as element data 530, a B2A table which is a color conversion table for converting Lab values in the Lab color space to coordinate values in the device dependent color space such as a CMYK color space or a cmyk color space.

An A2B0 tag and a B2A0 tag shown in FIG. 6 are information for performing a perceptual color conversion. The perceptual color conversion is mainly used for conversion of a wide color gamut photographic image since the perceptual color conversion emphasizes a gradation reproduction. An A2B1 tag and a B2A1 tag shown in FIG. 6 are information for performing a media-relative colorimetric color conversion or an absolute colorimetric color conversion. Since the colorimetric color conversion is true to a color measurement value, it is mainly used for conversion for color proofing output of digital proofs where an accurate color match is required. An A2B2 tag and a B2A2 tag shown in FIG. 6 are information for performing a saturation color conversion. Since the saturation color conversion emphasizes color vividness more than color accuracy, it is mainly used for conversion such as a graph display in business graphics.

6. Concrete Example of Processing Performed in System for Performing Color Conversion Processing by Adjusting Profile:

FIG. 7 illustrates the profile adjustment processing performed by the host apparatus 100 shown in FIG. 2. FIG. 8 illustrates a UI screen 800 displayed in step S102 in FIG. 7. Here, the UI is an abbreviation of a user interface. FIG. 9 illustrates print control processing in which the CMM 450 shown in FIG. 3 causes the host apparatus 100 to realize. The host apparatus 100 executes a plurality of processing in parallel by multitasking. Hereinafter, the profile adjustment processing and the print control processing will be described with reference to FIGS. 1 to 3.

In the profile adjustment processing shown in FIG. 7, step S102 corresponds to the profile reception step ST1, the adjustment target profile reception step ST2, the compensation selection reception step ST3, the storage selection reception step ST4, the intent reception step ST5, the profile reception function FU1, the adjustment target profile reception function FU2, the compensation selection reception function FU3, the storage selection reception function FU4, the intent reception function FU5, the profile reception unit U1, the adjustment target profile reception unit U2, the compensation selection reception unit U3, the storage selection reception unit U4, and the intent reception unit U5. Steps S110 to S112 correspond to the black spot information storage step ST6, the black spot information storage function FU6, and the black spot information storage unit U6. Step S116 corresponds to the adjustment reception step ST7, the adjustment reception function FU7, and the adjustment reception unit U7. Steps S114 and S120 to S124 correspond to the output step ST8, the output function FU8, and the output unit U8. In the print control processing shown in FIG. 9, steps S202 to S208 correspond to the color conversion step ST9, the color conversion function FU9, and the color conversion unit U9. Hereinafter, the description of "step" is omitted.

When the profile adjustment processing is started, the host apparatus 100 causes the display device 130 to display the UI screen 800 shown in FIG. 8 in S102. The UI screen 800 has an input profile specification field 811, an output profile specification field 812, checkbox fields 813, 814, and 815, a private tag use selection field 816, a rendering intent specification field 817, an adjustment point setting button 818, and a profile adjustment button 819.

The host apparatus 100 receives operations on the above-described fields and buttons by an input device 115, and advances the processing to S104 when the operation on the profile adjustment button 819 is received.

In the input profile specification field 811, the host apparatus 100 receives a specification of an input profile to be used for the color conversion processing from among the input profiles 610 stored in the storage device 114. The color conversion processing is processing of S202 to S208 shown in FIG. 9.

In the output profile specification field 812, the host apparatus 100 receives a specification of an output profile to be used for the color conversion processing from among the output profiles 620 stored in the storage device 114.

The processing of receiving a specification of the input profile in the input profile specification field 811 and the processing of receiving a specification of the output profile in the output profile specification field 812 correspond to the profile reception step ST1.

In the checkbox fields 813 and 814, the host apparatus 100 receives a selection as to whether the input profile 610 is to be the adjustment target profile 501 or the output profile 620 is to be the adjustment target profile 501. In the example shown in FIG. 8, a check mark is checked in the checkbox field 814 corresponding to the output profile specification field 812, which indicates that the output profile 620 is selected as the adjustment target profile 501.

The processing of receiving the selection of the adjustment target profile 501 in the checkbox fields 813 and 814 corresponds to the adjustment target profile reception step ST2.

In the checkbox field 815 attached with "black point compensation (BPC)", the host apparatus 100 receives a selection as to whether or not to perform a black point compensation in print control processing including the color conversion processing. The processing of receiving the selection in the checkbox field 815 corresponds to the compensation selection reception step ST3.

In the private tag use selection field 816, the host apparatus 100 receives a selection as to whether or not the black point information 540 is to be stored in the private tag 523 of the adjustment target profile 501. The processing of receiving the selection in the private tag use selection field 816 corresponds to the storage selection reception step ST4.

In the rendering intent specification field 817, the host apparatus 100 receives any one specification from among a plurality of rendering intents. Here, the rendering intent in which the specification is received is called a specified intent. It is assumed that the plurality of rendering intents include "perceptual", "relative colorimetric", "absolute colorimetric", and "saturation". "Relative-colorimetric" shown in the rendering intent specification field 817 in FIG. 8 means "absolute colorimetric".

The processing for receiving a specified intent in the rendering intent specification field 817 corresponds to the intent reception step ST5.

When the host apparatus 100 receives an operation on the adjustment point setting button 818, the host apparatus 100 receives a setting of an adjustment point representing the coordinates for performing a spot adjustment in the CMYK color space or the Lab color space. When the adjustment target profile 501 is the input profile 610, the CMYK values representing the coordinates of the adjustment point in the CMYK color space on the input side of the input profile 610 are received. When the adjustment target profile 501 is the output profile 620, the Lab values or the CMYK values representing the coordinates of the adjustment point in the Lab color space on the input side of the output profile 620 is received. When the CMYK values are received, the host apparatus 100 may convert the CMYK values in the adjustment point into the Lab values with reference to the input profile 610.

When the host apparatus 100 receives an operation on the profile adjustment button 819, the host apparatus 100 performs the processing after S104. In the processing after S104, the color conversion table 550 to be processed is a color conversion table corresponding to a specified intent, and the black point information 540 to be processed is black point information corresponding to a specified intent.

In S104, the host apparatus 100 determines whether or not the black point information 540 corresponding to the color conversion table of the specified intent is maintained in the private tag 523 of the adjustment target profile 501. When the black point information 540 is maintained in the private tag 523, in S106, the host apparatus 100 reads the black point information 540 from the private tag 523 of the adjustment target profile 501. The black point information 540 which is read out, represents a black point in the color conversion table 550 before an adjustment in the adjustment target profile 501, and is referred to in the profile adjustment of S116. Thereafter, the host apparatus 100 advances the processing to S116.

When the black point information 540 is not maintained in the private tag 523 in S104, the host apparatus 100 determines whether or not the before-adjustment black point information representing a black point in the color conversion table 550 before an adjustment is to be written in the private tag 523 in S108. When the selection to store the black point information 540 in the private tag 523 is received in the private tag use selection field 816, the host apparatus 100 advances the processing to S110. When the selection not to store the black point information 540 in the private tag 523 is received in the private tag use selection field 816, the host apparatus 100 advances the processing to S114.

When the black point information 540 is stored in the private tag 523, the host apparatus 100 calculates the before-adjustment black point information representing a black point in the color conversion table before an adjustment from the color conversion table 550 stored in the adjustment target profile 501 in S110. When the black point information is represented by XYZ values for each rendering intent according to the standard, the before-adjustment black point information is obtained from the color conversion table 550 by using a calculation method corresponding to the specified intent.

In S112 after the calculation of the before-adjustment black point information, the host apparatus 100 writes the obtained before-adjustment black point information in the private tag 523 of the adjustment target profile 501. Here, the host apparatus 100 may store only the before-adjustment black point information corresponding to the specified intent in the private tag 523 or may store the before-adjustment black point information corresponding to the specified intent in the private tag 523 while maintaining the black point information corresponding to the rendering intent different from the specified intent in the private tag 523.

The black point information storage step ST6 is performed on the above-described S110 to S112. After processing in S112, the host apparatus 100 advances the processing to S116.

When the black point information 540 is not stored in the private tag 523, the host apparatus 100 calculates the before-adjustment black point information representing a black point in the color conversion table before an adjustment from the color conversion table 550 stored in the adjustment target profile 501 in S114. When the black point information is represented by XYZ values for each rendering intent according to the standard, the before-adjustment black point information is obtained from the color conversion table 550 by using a calculation method corresponding to the specified intent. Thereafter, the host apparatus 100 advances the processing to S116.

In S116, the host apparatus 100 receives the spot adjustment of the color conversion table 550 stored in the adjustment target profile 501, and stores the color conversion table 551 after an adjustment in the adjustment target profile 501 as shown in FIG. 1. By the processing of S116, the adjustment reception step ST7 is performed.

Figure 10:
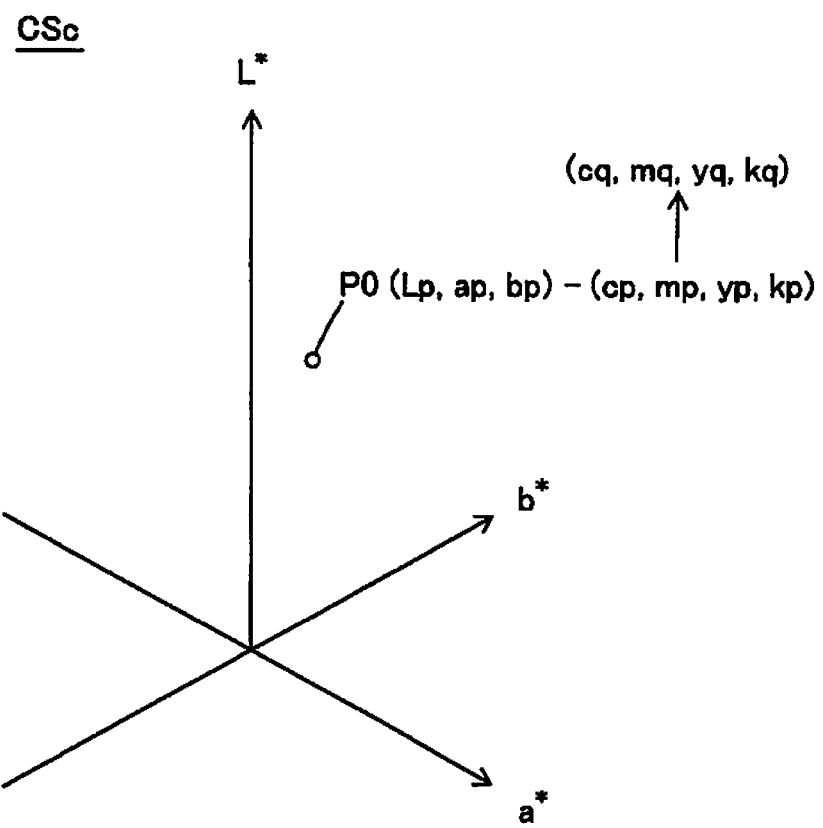
FIG. 10 is a diagram schematically showing an example of a spot adjustment.

FIG. 10 schematically illustrates the spot adjustment of adjustment points P0. In the spot adjustment shown in FIG. 10, when the adjustment target profile 501 is the output profile 620, a situation is shown in which the cmyk values $(c_p, m_p, y_p, k_p)$ associated with the coordinate values $(L_p, a_p, b_p)$ of the adjustment points P0 in the Lab color space, which is the profile connection space $CS_c$, are changed. When an operation to change the cmyk values $(c_p, m_p, y_p, k_p)$ to the cmyk values $(c_q, m_q, y_q, k_q)$ is received, the B2A table 621 of the output profile 620 is adjusted such that the cmyk values $(c_q, m_q, y_q, k_q)$ after the change are associated with the coordinate values $(L_p, a_p, b_p)$. When there are a plurality of adjustment points P0, the B2A table 621 of the output profile 620 is adjusted such that the cmyk values after the change are associated with each of the adjustment points P0. In the Lab color space, the cmyk values associated with the periphery of the adjustment points P0 are changed, for example, at a rate according to a distance from the adjustment point P0 by smoothing processing.

When an adjustment amount of the spot adjustment is received based on the Lab values, the spot adjustment can be performed in the same manner if an adjustment amount based on the Lab values is converted into an adjustment amount based on the cmyk values with reference to the output profile 620. When an adjustment amount of the spot adjustment is received based on the CMYK values, the spot adjustment can be performed in the same manner if an adjustment amount based on the CMYK values is converted into an adjustment amount based on the cmyk values with reference to the input profile 610 and the output profile 620.

Further, when the adjustment target profile 501 is the input profile 610, the spot adjustment can also be performed in the same manner. For example, when an operation to change the Lab values associated with the CMYK values which are the coordinate values of the adjustment point in the CMYK color space is received, the A2B table 611 of the input profile 610 is adjusted such that the Lab values after the change are associated with the CMYK values. In the CMYK color space, the Lab values associated with the periphery of the adjustment points are changed, for example, at a rate according to a distance from the adjustment point by the smoothing processing. When an adjustment amount of the spot adjustment is received based on the CMYK values, the spot adjustment can be performed in the same manner if an adjustment amount based on the CMYK values are converted into an adjustment amount based on the Lab values with reference to the input profile 610. When an adjustment amount of the spot adjustment is received based on the cmyk values, the spot adjustment can be performed in the same manner if an adjustment amount based on the cmyk values are converted into an adjustment amount based on the Lab values with reference to the output profile 620.

Since the correspondence relationship of the color conversion table 550 is also adjusted around the adjustment point, the black point in the color conversion table 550 may be changed unintentionally. In this case, even though a user adjusted the color conversion table to improve a color reproduction accuracy, the intended adjustment effect may not be obtained due to a black point compensation that is deviated from the intention performed in print control processing by the CMM 450.

Therefore, in the present concrete example, the host apparatus 100 stores the before-adjustment black point information in the private tag 523 in S112, thereby enabling the black point compensation using the before-adjustment black point information at the time of the color conversion processing, and the same black point compensation effect as before an adjustment of the color conversion table can be obtained.

After receiving the adjustment of the color conversion table 550, in S118, the host apparatus 100 determines whether or not the black point information 540 corresponding to the color conversion table of the specified intent is maintained in the private tag 523 of the adjustment target profile 501. When the black point information 540 is maintained in the private tag 523, since the before-adjustment black point information is stored in private tag 523, the host apparatus 100 terminates the profile adjustment processing as a normal termination. When the black point information 540 is not maintained in the private tag 523, there is a possibility that the intended adjustment effect may not be obtained if the black point in the color conversion table 550 is moved before and after the adjustment. In order to notify a user of the fact that the black point in the color conversion table 550 is moved before and after the adjustment, the host apparatus 100 performs the processing of S120 to S124.

In S120, the host apparatus 100 calculates the after-adjustment black point information representing a black point in the color conversion table after an adjustment from the color conversion table 551 after an adjustment stored in the adjustment target profile 501. When the black point information is represented by XYZ values for each rendering intent according to the standard, the after-adjustment black point information is obtained from the color conversion table 551 by using a calculation method corresponding to the specified intent.

Thereafter, in S122, the host apparatus 100 determines whether or not the black point in the color conversion table is moved before and after the adjustment. When the before-adjustment black point information and the after-adjustment black point information are the same, since the black point in the color conversion table is not moved before and after the adjustment, the host apparatus 100 terminates the profile adjustment processing as a normal termination. When the before-adjustment black point information and the after-adjustment black point information are different, since the black point in the color conversion table is moved before and after the adjustment, the host apparatus 100 notifies of mismatching information representing a failure in profile adjustment in S124. The mismatch information is a state representing that the before-adjustment black point information and the after-adjustment black point information are different, and for example, is displayed on the display device 130. The mismatch information includes warning information, error information, or the like, and specifically includes display information such as "black point is moved before and after adjustment" and "profile adjustment failure". Here, the warning means a state in which an adjustment result of the color conversion table remains, and the error means a state in which the adjustment itself of the color conversion table is invalid.

After S124, the host apparatus 100 terminates the profile adjustment processing as a warning or an error termination.

By performing the processing of S114 and S120 to S124 described above, when the black point information 540 is not stored in the private tag 523 of the adjustment target profile 501, a user can know that the intended adjustment effect cannot be obtained due to the fluctuation of the black point. Therefore, the user can efficiently adjust the profile.

The black point information 540 stored in the private tag 523 is referred to at the time of the print control processing shown in FIG. 9 in a case where the black point compensation is set to be performed in the print control processing by the CMM 450.

When the print control processing shown in FIG. 9 is started, in S202, the host apparatus 100 determines, for each of the input profile 610 and the output profile 620, whether or not the black point information 540 corresponding to the color conversion table of the specified intent is maintained in the private tag 523. For the profile in which the black point information 540 is maintained in the private tag 523, the host apparatus 100 reads the black point information 540 from the private tag 523 in S204. When the processing target of S204 is the adjustment target profile 501, the black point information 540 to be read, represents a black point in the color conversion table 550 before an adjustment in the adjustment target profile 501, and is referred to in black point compensation performed in the color conversion processing in S208. Thereafter, the host apparatus 100 advances the processing to S208.

For the profile in which the black point information 540 is not maintained in the private tag 523 in S202, the host apparatus 100 calculates the black point information representing a black point in the color conversion table from the color conversion table stored in the profile in S206. The black point information represents a black point of the current color conversion table 550. In a case where the processing target of S206 is the adjustment target profile 501, when the color conversion table 550 is adjusted in S116 in FIG. 7, the black point information represents a black point of the color conversion table 551 after an adjustment. When the black point information is represented by XYZ values for each rendering intent according to the standard, the black point information is obtained from the color conversion table 550 by using a calculation method corresponding to the specified intent. Thereafter, the host apparatus 100 advances the processing to S208.

In S208, the host apparatus 100 performs the color conversion processing with a black point compensation based on black point information corresponding to the A2B table 611 of the specified intent of the input profile 610 and black point information corresponding to the B2A table 621 of the specified intent of the output profile 620. This color conversion processing can be performed, for example, by using the method shown in FIG. 1.

First, the host apparatus 100 refers to the A2B table 611 (refer to FIG. 3) of the input profile 610 and converts the CMYK values ($C_i$, $M_i$, $Y_i$, $K_i$) which are input coordinate values into the Lab values ($L1_i$, $a1_i$, $b1_i$) which are the device independent coordinate values. Next, the host apparatus 100 performs a black point compensation based on the black point information representing the black point of the A2B table 611 of the specified intent stored in the input profile 610 and the black point information representing the black point of the B2A table 621 of the specified intent stored in the output profile 620. When the black point information is stored in the private tag 523 of the input profile 610, the black point information stored in the private tag 523 is used for a black point compensation. When the black point information is stored in the private tag 523 of the output profile 620, the black point information stored in the private tag 523 is used for a black point compensation. FIG. 1 shows that the Lab values ($L1_i$, $a1_i$, $b1_i$) before a black point compensation are compensated to the Lab values ($L2_i$, $a2_i$, $b2_i$). Furthermore, the host apparatus 100 converts the Lab values ($L2_i$, $a2_i$, $b2_i$) into the cmyk values ($c_i$, $m_i$, $y_i$, $k_i$) which are the output coordinate values with reference to the B2A table 621 of the output profile 620.

In S210 after the color conversion processing, the host apparatus 100 performs halftone processing with respect to the cmyk values ($c_i$, $m_i$, $y_i$, $k_i$), and outputs halftone data as obtained print data to the printer 200. Thereafter, the host apparatus 100 terminates the print control processing.

In the halftone processing, dither halftone processing, error diffusion halftone processing, density pattern halftone processing, or the like can be used. The obtained halftone data is data representing a formation state of a dot, and may be binary data representing the presence or absence of a dot formation, or may be multi-value data of three or more gradations that can correspond to dots of different sizes, such as large, medium, and small dots. The printer 200 having received the halftone data ejects the ink from the recording heads 220 in accordance with the halftone data to form the output image IM0 on the print substrate ME1.

As described above, in the present concrete example, the black point information 540 representing a black point in the color conversion table 550 before an adjustment is stored in the private tag 523 of the adjustment target profile 501. If a black point compensation based on the black point information 540 is performed at the time of the color conversion processing when the black point information 540 is stored in the private tag 523 of the adjustment target profile 501, a user can assume the same black point compensation effect as before an adjustment of the color conversion table 550 even if the color conversion table 550 of the adjustment target profile 501 is adjusted to change the black point. Therefore, the present aspect can realize the adjustment of the profile quickly and with high accuracy, and can efficiently adjust the profile.

Further, even when the black point information 540 is not stored in the private tag 523, a user can know that the intended adjustment effect cannot be obtained due to the fluctuation of the black point. Therefore, unnecessary trial and error in the profile adjustment are suppressed, and efficient profile adjustment is realized.

7. Modification Example:

The present disclosure can be considered in various modifications.

For example, the output device is not limited to an ink jet printer, and may be an electrophotographic printer such as a laser printer using toner as a color material, a three-dimensional printer, a display device, or the like.

The types of the color materials that form an image are not limited to C, M, Y, and K, and may include $L_c$, $L_m$, DY, $O_r$, that is, orange, $G_r$, that is, green, $L_k$, a non-colored color material for improving image quality, or the like, in addition to C, M, Y, and K.

The output color space is not limited to the cmyk color space, and may be a CMY color space, an RGB color space, or the like.

The target device is not limited to the target print machine, and may be a display device or the like.

The input color space is not limited to the CMYK color space, and may be a CMY color space, an RGB color space, or the like.

The processing described above can be changed as appropriate, such as changing the order, omitting a part, or adding another processing.

8. Closing:

As described above, according to the present disclosure, it is possible to provide a technology and the like capable of efficiently adjusting a profile with various aspects. Of course, the above-described basic operation and effect can be obtained even with the technology configuring only with the configuration components according to the independent claims.

Further, configurations in which the configurations disclosed in the above-described example are replaced with each other or changed in combination, configurations in which the configurations disclosed in the known art and the above-described example are replaced with each other or changed in combination, or the like can also be performed. The present disclosure also includes these configurations or the like.

What is claimed is:

1. A profile adjustment method for adjusting a profile used in color conversion processing for performing a black point compensation, that is color conversion processing from input coordinate values in an input color space dependent on an input device to output coordinate values in an output color space dependent on an output device, the method comprising:
    receiving any one of an input profile representing a correspondence relationship between the input coordinate values and device independent coordinate values in a profile connection space and an output profile representing a correspondence relationship between the device independent coordinate values and the output coordinate values as an adjustment target profile;
    determining whether black point information representing a black point in a color conversion table of the adjustment target profile is stored in a private tag of the adjustment target profile before adjusting the color conversion table of the adjustment target profile;
    obtaining the black point information from the color conversion table of the adjustment target profile in response to determining that the black point information is not stored in the private tag of the adjustment target profile;
    storing the black point information in the private tag of the adjustment target profile after obtaining the black point information from the color conversion table of the adjustment target profile and before adjusting the color conversion table of the adjustment target profile; and
    receiving an adjustment of the color conversion table of the adjustment target profile.

2. The profile adjustment method according to claim 1, further comprising:
    receiving specifications of the input profile and the output profile used for the color conversion processing.

3. The profile adjustment method according to claim 1, wherein
    in the color conversion processing, the black point compensation is performed when a setting is to perform the black point compensation, and
    the profile adjustment method further comprises
        receiving a selection of whether or not to make the setting to perform the black point compensation in the color conversion processing.

4. A profile adjustment method for adjusting a profile used in color conversion processing for performing a black point compensation, that is color conversion processing from input coordinate values in an input color space dependent on an input device to output coordinate values in an output color space dependent on an output device, the method comprising:
    receiving any one of an input profile representing a correspondence relationship between the input coordinate values and device independent coordinate values in a profile connection space and an output profile representing a correspondence relationship between the device independent coordinate values and the output coordinate values as an adjustment target profile;
    obtaining black point information from a color conversion table and storing the black point information in a private tag when the black point information representing a black point in the color conversion table is not stored in the private tag of the adjustment target profile before adjusting the color conversion table stored in the adjustment target profile;
    receiving an adjustment of the color conversion table; and
    receiving a selection of whether or not to store the black point information in the private tag of the adjustment target profile, wherein
    when the selection to store the black point information is received, the black point information is stored in the private tag of the adjustment target profile during the obtaining of the black point information and the storing of the black point information.

5. The profile adjustment method according to claim 4, further comprising:
    outputting mismatch information representing that before-adjustment black point information and after-adjustment black point information are different when the before-adjustment black point information representing a black point of the color conversion table before an adjustment and the after-adjustment black point information representing a black point of the color conversion table after the adjustment are different, in a case when the black point information is not stored in the private tag of the adjustment target profile after the adjustment of the color conversion table.

6. The profile adjustment method according to claim 1, further comprising:
    receiving any one from among a plurality of rendering intents as a specified intent, wherein
    during the obtaining of the black point information and the storing of the black point information, and during the receiving of the adjustment of the color conversion table, a table corresponding to the specified intent is used as the color conversion table.

7. A profile adjustment apparatus for adjusting a profile used in color conversion processing for performing a black point compensation, that is color conversion processing from input coordinate values in an input color space dependent on an input device to output coordinate values in an output color space dependent on an output device, the apparatus comprising:
    a processor that
        receives any one of an input profile representing a correspondence relationship between the input coordinate values and device independent coordinate values in a profile connection space and an output profile representing a correspondence relationship between the device independent coordinate values and the output coordinate values as an adjustment target profile;
        determines whether black point information representing a black point in a color conversion table of the adjustment target profile is stored in a private tag of the adjustment target profile before adjusting the color conversion table of the adjustment target profile;

obtains the black point information from the color conversion table of the adjustment target profile in response to determining that the black point information is not stored in the private tag of the adjustment target profile;

stores the black point information in the private tag of the adjustment target profile after obtaining the black point information from the color conversion table of the adjustment target profile and before adjusting the color conversion table of the adjustment target profile; and receives an adjustment of the color conversion table.

8. A non-transitory computer-readable storage medium storing a profile adjustment program for adjusting a profile used in color conversion processing for performing a black point compensation, that is color conversion processing from input coordinate values in an input color space dependent on an input device to output coordinate values in an output color space dependent on an output device, the program causing a computer to realize functions for:

receiving any one of an input profile representing a correspondence relationship between the input coordinate values and device independent coordinate values in a profile connection space and an output profile representing a correspondence relationship between the device independent coordinate values and the output coordinate values as an adjustment target profile;

determining whether black point information representing a black point in a color conversion table of the adjustment target profile is stored in a private tag of the adjustment target profile before adjusting the color conversion table of the adjustment target profile;

obtaining the black point information from the color conversion table of the adjustment target profile in response to determining that the black point information is not stored in the private tag of the adjustment target profile;

storing the black point information in the private tag of the adjustment target profile after obtaining the black point information from the color conversion table of the adjustment target profile and before adjusting the color conversion table of the adjustment target profile; and receiving an adjustment of the color conversion table of the adjustment target profile.

\* \* \* \* \*